United States Patent [19]

Towning

[11] 4,299,056
[45] Nov. 10, 1981

[54] SELF-WATERING PLANT GROWING BAG

[76] Inventor: Dennis J. Towning, 8 Colborne St., Suite 401, Toronto, Ontario, Canada, M5E 1E1

[21] Appl. No.: 128,284

[22] Filed: Mar. 7, 1980

[51] Int. Cl.³ .................. A01G 25/00; A01G 27/00
[52] U.S. Cl. .................................................. 47/81
[58] Field of Search ............... 47/14, 15, 16, 59, 60, 47/61, 62, 63, 64, 79, 80, 81; 206/423

[56] References Cited

U.S. PATENT DOCUMENTS

| | | | |
|---|---|---|---|
| 1,172,787 | 2/1916 | Gray | 47/14 |
| 2,524,246 | 10/1950 | Young | 47/18 |
| 2,813,063 | 11/1957 | Bjorksten | 47/81 |
| 3,524,279 | 8/1970 | Adams | 47/64 |
| 3,613,309 | 10/1971 | Coburn | 47/64 |
| 3,898,766 | 8/1975 | Goldstaub | 47/81 |
| 3,962,823 | 6/1976 | Zipperer | 206/423 |
| 4,079,547 | 3/1978 | Walker | 47/62 |
| 4,163,343 | 8/1979 | Schoenfield | 47/14 |

FOREIGN PATENT DOCUMENTS 2908615 9/1979 Fed. Rep. of Germany .......... 47/81
1414605 9/1965 France .................................. 47/81

OTHER PUBLICATIONS

Anon. "Hydroponics, 'Peat Bag' Without a Bag", *The Grower*, Oct. 25, 1979, p. 25, (Ad on page included).
Anon. (Ad), "Whalehide", *The Grower*, Oct. 13, 1977, p. 725.

*Primary Examiner*—James R. Feyrer
*Attorney, Agent, or Firm*—Cullen, Sloman, Cantor, Grauer, Scott & Rutherford

[57] ABSTRACT

A normally horizontally arranged sack-like bag formed of a capillary type, wicking sheet material which is filled with a plant growth material such as peat moss, soil compositions and the like. At least one loose flap, which is part of a lower surface forming portion of the bag, extends downwardly from one edge of the bag for immersion in a liquid, such as water, water-fertilizer mixtures and the like. The liquid is continuously flowed by capillary action up the flap and along at least the lower surface of the bag for continuous dispersion into the filler material for feeding liquid to the roots of plants which are grown through the upper surface of the bag. Preferably, the sheet material is pre-selected to provide a capillary flow which roughly corresponds to the expected loss of liquid to the plants and the atmosphere to thereby create a generally equilibrium flow of liquid to and from the bag.

4 Claims, 6 Drawing Figures

SELF-WATERING PLANT GROWING BAG

BACKGROUND OF INVENTION

In growing plants from seeds or seedlings, it is common to utilize various types of containers filled with a plant growing material, such as peat moss, soil, soil-like compositions, and the like. Containers in the form of bags have also been used for this purpose by appropriately cutting open the upper portions of the bags so that plants may be grown in the filler material contained within the bags.

In the past, the bags were made of a suitable plastic material, such as polyethylene or the like. Typically these bags were filled with peat moss or peat moss and fertilizer mixtures or similar types of materials. For watering the plants, water was supplied to the bags, through water tubing, at the upper surfaces of the bags near the plants. Excess water was permitted to drain from the bottoms of the bags through perforations. Sometimes, matting sheets were positioned beneath the bags to absorb excess water.

The plastic bags used in the prior conventional practices served as a means of isolating the fillers from possible contamination by soil organisms which adversely effect the plants, as well as to contain sufficient material for plant growth purposes.

The provision of water or water fertilizer mixtures to each bag and to the plants in each bag required a relatively extensive network of irrigation piping and tubing, as well as considerable labor. In commercial growing, a relatively large number of bags are needed. Consequently, considerable labor was needed to cut and perforate each bag to the extent necessary for watering and drain purposes as well as to set-up and maintain the irrigation system.

Moreover, bag irrigation tubes are occasionally plugged by foreign matter or have otherwise failed, which interferred with the expected water feed. In addition the control of the water feed system, particularly the rate and timing of water flow, required considerable care. Whether manual or automatic, the prior watering systems were sporadic in nature, with the attempt being made to provide water on some pre-scheduled basis. The growers experience, including his consideration of environmental factors such as light levels, temperature, humidity, etc., were considered in determining water feeding amounts and schedules. But, because of the many variables obviously, optimum watering was not generally attainable.

Because of the relatively sophisticated control requirements, a more automatic watering system, less dependent upon grower experience and instrumentation, was needed. Further, in commercial use of bags for large scale growing of plants, because of the necessary equipment, instrumentation, etc., protective shelters, such as greenhouses have been needed. Also, the bags themselves had to be handled carefully to avoid breakage or puncturing which would present handling problems within a shelter.

Hence, the invention herein relates to improvements in growing bags and bag systems which substantially minimizes many of the problems encountered in prior bag systems.

SUMMARY OF INVENTION

The invention herein contemplates growing plants within a sack-like, horizontally flattened bag filled with a suitable plant growing filler material, such as peat moss, soil, soil-like compositions and the like. The bag itself is made of a flexible, sheet material which is strongly capillary acting so that it functions as a wick surrounding the filler. A loose flap or "tail" which is integral with a bag edge is arranged to extend downwardly from the bag for immersion in a pool of liquid, such as water, water-fertilizer mixtures and the like, located adjacent to and immediately below the bag. Thus, the flap, acting like a wick, continuously capillary flows liquid upwardly at a pre-determined rate, dispersing the liquid throughout the bag forming sheet from which the liquid disperses into the mass of plant growth filler material.

The continuous flow of the liquid from the bag itself into the outer portions of the filler material and then inwardly therefrom, provides water and like liquids to the fine root portions of the plants whose roots are embedded within the filler. The plants extend upwardly through the upper surface of the bag through openings or slits cut therein. Next, there is a continuous flow of liquid from the pool or reservoir, through the tail or flap, then through the bag and into the filler material and plant roots which, if the capillary rate of the cloth sheet material is properly chosen, will be in equilibrium with the loss of liquid through the plant use, evaporation, etc.

With the continuous, equilibrium type of flow, described above, the bag is self-watering, with the filler constantly moistened to the expected degree. Hence, the bag can be handled as a unit, easily installed for use by manually positioning it upon an appropriate support wherein its flap can be immersed in liquid. Likewise, it can be removed, as a unit, and disposed of whenever the filler is to be replaced.

The wicking type of capillary acting material, which generally is a non-woven cloth having a capillary tendency, normally is water and air permeable. These qualities are desirable for many plant growing applications. However, for some purposes, where it is desired to limit the evaporation loss of moisture upwardly from the filler or to otherwise protect the filler from rain or airborne matter, the upper surface, that is, the upper half of the bag can be made of a sheet plastic material which is air and water impervious. Slits cut in the material permit access to the filler for inserting seeds or seedlings and for the growth of plants therethrough. Such slits also allow gases to enter or escape from the bag.

Advantages of this bag growing system include a reduction in the labor costs and handling costs of transporting, positioning, and removing various types of filler materials, such as peat moss and other special growing compositions. In addition, due to the advantage of continuous self-watering, better plant growth is obtained. Further, this self-watering system permits long periods of inattention to the plants, that is, eliminating daily watering, etc.

An object of this invention is to provide a bag and bag growing system which is self-watering, may be utilized without shelters in many places, is sufficiently breathable or air permeable to prevent excessive heat build up within the bag and to permit sufficient evaporation of water to cool the plant roots when necessary, and eliminates the need for complicated watering equipment.

Another object of this invention is to provide a system for continuous watering of the plant growing materials and the plants on a demand basis, i.e., in response to the loss of water from the bag filler, thereby eliminating extensive control systems. That is, merely by providing what amounts to a reservoir or an available pool of water or water fertilized mixtures, generally, each bag takes what it needs as it needs it. This minimizes stress on the plants due to over or under watering cycles, excessive or unexpected dryness, etc. Moreover, it simplifies the use of bags and makes it possible to utilize the bag growing technology in open field agriculture.

A basic object of the invention is to provide a continuous flow of water or water and fertilized mixtures at a rate which is, in essence, regulated by the plants and the plant growth material through unimpeded flow paths, i.e., without conventional tubing. This permits the reduction of stresses on plants resulting from inadequate or intermittent watering schedules, reduces operator skill requirements and investments in equipment and controls and reduces overall labor costs.

Moreover, the bag system herein permits re-use of bags since theres is a minimization of damage to the bags in use, storage or shipment. Further, the bags can provide an automatic cooling system due to evaporation of water through the permeable bag forming material. Such material also permits air to enter and gases to escape from the filler contents and permits the plants, in some cases to root directly through the bag surface without pre-cutting.

These and other objects and advantages will become apparent upon reading the following description, of which the attached drawings form a part.

DETAILED DESCRIPTION

Figure 1:
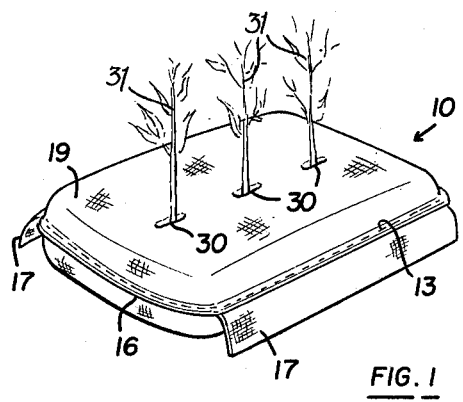
FIG. 1 is a perspective view of a bag, per se, with plants growing upwardly therefrom.

Referring to the drawings, the sack-like bag 10, is normally horizontally arranged for growing purposes. The size of the bag may vary considerably but typically the bag may be from one to two feet wide and from two to three feet long, with the dimensions being considerably variable.

Figure 3:
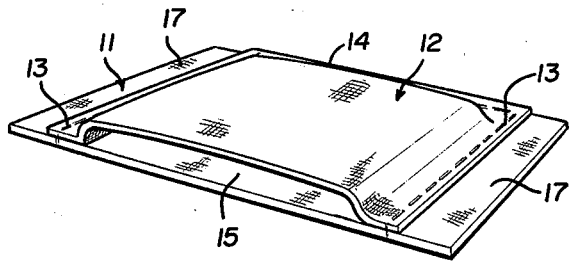
FIG. 3 illustrates, in perspective, the assembly of a bag having opposing flaps.

Referring to FIG. 3, the typical bag is formed of a lower, thin flexible sheet 11 and an upper, thin flexible sheet 12 which is of less width than the lower sheet and is centered thereupon. The side edges of the upper sheet are fastened by stitches 13 to the lower sheet and the lower end of the bag is secured by a row of stitches 14 to the lower sheet, leaving an open end 15 through which the filler material may be inserted. Once the filler material is loaded into the bag, the end 15 may be secured as by stitches 16 (see FIG. 1). Alternate methods of securing may be used, such as staples, heat seals or the like, as appears appropriate.

Figure 2:
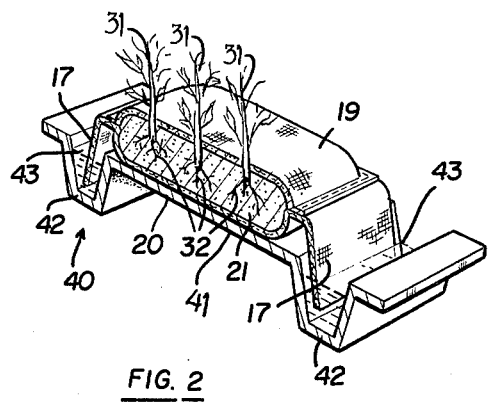
FIG. 2 is a perspective, cross sectional view of a bag supported upon a platform having watering troughs.

The upper sheet forms an upper growth surface 19 and the lower sheet forms a base or wick surface 20. As shown in FIG. 2, the mass of filler material 21 substantially fills the bag so that the upper and lower surfaces are substantially flat. The filler may be formed of peat moss, soil or soil-like compositions or the like materials which are commonly used for growing plants.

The lower flexible sheet 11 is made of a capillary type matting sheet so as to form a wick. Commercially available matting type sheets are formed of non-woven synthetic fabrics, such as polyesters, rayon and the like, which are felted together and compressed. Depending upon the fibers utilized, the degree of compression, as well as the use of any bonding materials for bonding the fibers together at their intersections, the capillary action of the material can be varied and pre-determined.

An example of a commercially available capillary matting or fabric, is one known by the trademark "Fibertex" and "PPR 433" which is manufactured by FIBERTEX, A/S. The "Fibertex" material is formed of mixtures of synthetic fibers which are felted together in a conventional manner. The weight is approximately 155 grams per square meter and the softening point is approximately 130° C., with its melting point being at approximately 170° C. This material will exhibit a capillary rise of roughly 13 centimeters in 30 minutes, with the amount variable depending upon variances in the fabric and atmospheric conditions. In addition, such material may have an average field capacity, that is liquid storage capacity of about 580 cubic centimeters per square meter.

The capillary mat material is preferably selected in a capillary flow range which approximates the expected use of liquid from the filled bag due to plant use and evaporation and the like. That is, by choosing a capillary type material whose water or liquid flow characteristics approximates the amount of liquid used in the system, an equilibrium is established to continuously maintain the desired flow through the filler and to the plants.

The upper flexible sheet 12 which forms the upper or growth surface 19 of the bag is preferably made of the same material as the lower sheet. However, for certain purposes, i.e. where it is desired to restrict the loss of liquid or where mulching is desired, etc., the upper sheet may be formed of a thin, unbroken plastic sheeting, such as polyethylene sheet material of thin gauge, which is water and air impervious.

Figure 4:
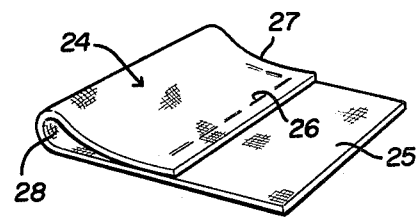
FIG. 4 illustrates the assembly of a bag having a single flap.

FIG. 4 illustrates a second form of bag which may be made of a single sheet 24 of the capillary matting material, which sheet is folded over to form an upper and lower fold with an exposed single edge flap 25. The upper fold is stitched at 26 along its side to the lower fold and the ends of the folds are stitched together by a row of stitching 27 which leaves the opposite end open at 28 for insertion of the filler material. Once the bag is filled, the open end may be stitched closed.

In order to grow plants in the bag, slits 30 are cut in the upper growth surface of the bag at appropriate locations. Through these slits, plants 31, in the form of seedlings, seeds, or the like, are inserted so that the roots 32 grow within the filler material.

Instead of cutting slits in the upper growth surface 19, the plants may be placed within peat pots 35 so that the potted plants 36 may be rested upon the upper surface of the bag. The roots of the plants 36 will tend to grow through the peat pots and into the bags, assuming the bags are completely made of the capillary matting material.

FIG. 2 illustrates a bag in cross-section, rested upon a support frame 40. The frame provides a raised platform 41 upon which the bag is positioned. Troughs 42 arranged on opposite sides of the platform. The troughs may be either continuously or intermittently filled with liquid 43, such as water, a water-fertilizer mixture, or the like. The side flaps 17 extend into the troughs and are immersed in the liquid so that they continuously wick or capillary lift the liquid upwardly and to their integral bag lower base or wick surface 20.

Figure 5:
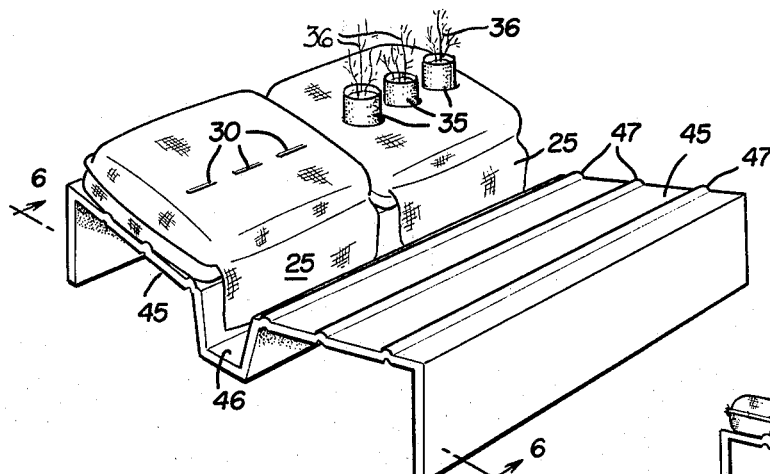
FIG. 5 illustrates a pair of bags positioned upon an elongated rack or support platform arranged to support a number of bags.
Figure 6:
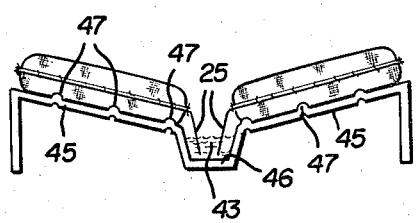
FIG. 6 is an end view taken in the direction of arrows 6—6 of FIG. 5, but showing two bags arranged on opposite support platforms adjacent a central trough.

Alternatively, the support frame may be provided in the form of double shaped platforms 45, arranged side-by-side, and separated by a trough 46 (see FIGS. 5 and 6). This form of platform may be made of preformed plastic material, or wood or bent sheet metal which is provided with a suitable protective coating. Preferably, ridges or ribs 47 are formed on the upper surfaces of the platform and the platforms are sloped slightly so that the ridges tend to frictionally engage and hold the bags against slipping downhill. These bags are provided with the single flaps 25 which are immersed in the liquid 43 contained in the trough 46. To maintain the liquid level at desired height, the ends of the trough may be blocked off with walls.

The synthetic fiber capillary matting material prolongs the lives of the bags so that the bags may be emptied and re-used after one or more growths of plants have taken place. The area of the flaps should be no less than 3% of the total surface area of the bag proper and not more than about 66% of the same area. However, the exact size of the flaps may be varied and can best be determined by trial and error for the particular kinds of plants to be grown. Preferably, the capillary rise of the flap is in the order of 5 to 20 centimeters and the capillary matting material should have a feed capacity of between 100 and 1000 cubic centimeters of water per square meter of area so that a range of materials and flap lengths can be selected to establish the desired equilibrium of liquid flow. The equilibrium flow will vary considerably depending upon the nature of the plants, the atmospheric conditions of the area, seasonal conditions of moisture, etc. Thus, equilibrium flow will not be precise, but rather will be rough and will have to be varied by trial and error for a particular installation.

Significantly, where the entire bag is made of the capillary matting fabric, liquid is applied to the filler outer surface portions from all directions to constantly maintain the input of liquid toward the center of the filler and particularly at the fine root ends. Even where the upper sheet of the bag is of a water and air impervious material, there is a relatively uniform and continuous flow dispersed through the filler in substantially the same manner.

Having fully described an operative embodiment of this invention, I now claim:

1. A self-watering plant growing bag comprising:

a generally flattened, normally horizontally arranged, closed sack-like bag formed of thin, flexible sheet material arranged to provide a generally flat and horizontally arranged upper, plant growing surface portion and a lower, liquid feed surface portion, and with the bag having elongated, horizontally arranged, opposite side and end edge portions;

a mass of plant growing filler material, such as peat moss, soil-like compositions and the like, filling the bag;

the bag lower, liquid feed surface portion being formed of an originally flat, sheet of capillary-type wicking material, and the upper, plant growing surface portion of the bag being formed of a separate sheet which is smaller than the lower sheet and whose edges are secured to the lower sheet so that a relatively wide edge portion of the lower sheet is free of and uncovered by the upper sheet, and opposing edges of said upper sheet being located considerably inwardly of opposing edges of the lower sheet so as to provide enlarged loose flaps, integral with the lower sheet, on opposing edges thereof;

and said flaps loosely extending downwardly from the bag edges and adapted for having their lower portions immersed in a liquid, such as water, water-fertilizer mixtures and the like;

whereby the roots of plants may be grown within the bag filler material, with the plants extending upwardly from the upper plant growing surface of the bag, and liquid continuously flows through capillary action up the flaps and substantially uniformly spreads out by capillary action, throughout the sheet material forming the lower liquid feed surface of the bag for dispersing the liquid into the filler portions adjacent thereto, and thereby, close to the plant roots for self-watering the plants.

2. A self-watering plant growing bag as defined in claim 1, and wherein the entire bag, including the sheet material forming the upper plant growing surface portion being formed of the capillary-type, wicking sheet material, for distributing liquid by capillary action to the outer portions of the entire mass of filler material.

3. A self-watering plant growing bag as defined in either claims 1 or 2 above and said wicking material being preselected to continuously capillary flow a predetermined quantity of liquid which generally corresponds to the liquid consumption of the plants grown in the filler mass and evaporation and any other losses, to maintain a substantial equilibrium between liquid flow into the filler mass and liquid dissipation therefrom.

4. A self-watering plant growing assembly comprising:

a generally flattened, normally horizontally arranged, close sack-like bag formed of thin, flexible sheet material arranged to provide a generally flat and horizontally arranged upper, plant growing surface portion and a lower, liquid feed surface portion, and with the bag having elongated, horizontally arranged, opposite side and end edge portions;

a mass of plant growing filler material, such as peat moss, soil-like compositions and the like, filling the bag;

the bag lower, liquid feed surface portion being formed of an originally flat, sheet of capillary-type wicking material, and the upper, plant growing surface portion of the bag being formed of a separate sheet which is smaller than the lower sheet and whose edges are secured to the lower sheet so that a relatively wide edge portion of the lower sheet is free of and uncovered by the upper sheet, and opposing edges of said upper sheet being located considerably inwardly of opposing edges of the lower sheet so as to provide enlarged loose flaps, integral with the lower sheet, on opposing edges thereof, and said flaps loosely extending downwardly from the bag edges and adapted for having their lower portions immersed in a liquid, such as water, water-fertilizer mixtures and the like;

a platform supporting said bag, at least one liquid containing trough adjacent one edge of said platform for receiving one of said flaps, and elevated ribs formed on said platform, generally parallel to said trough, for impressing into the lower surface of the bag for holding the bag against movement while not interfering with the capillary flow; whereby the roots of the plants may be grown within the bag filler material, with the plants extending upwardly from the upper plant growing surface of the bag, and liquid continuously flows through capillary action up the flaps and substantially uniformly spreads out by capillary action, throughout the sheet material forming the lower liquid feed surface of the bag for dispersing the liquid into the filler portions adjacent thereto, and thereby, close to the plant roots for self-watering the plants.

* * * * *